United States Patent [19]

Baccei

[11] 4,295,909
[45] Oct. 20, 1981

[54] CURABLE POLYBUTADIENE-BASED RESINS HAVING IMPROVED PROPERTIES

[75] Inventor: Louis J. Baccei, Farmington, Conn.

[73] Assignee: Loctite Corporation, Newington, Conn.

[21] Appl. No.: 195,986

[22] Filed: Oct. 10, 1980

Related U.S. Application Data

[63] Continuation of Ser. No. 64,170, Aug. 6, 1979, abandoned, which is a continuation of Ser. No. 813,207, Jul. 5, 1977, abandoned, which is a continuation-in-part of Ser. No. 546,250, Feb. 3, 1975, abandoned.

[51] Int. Cl.$^3$ ............................ C09J 5/02; C08F 8/30; C08L 75/04
[52] U.S. Cl. ................................ 156/307.3; 156/331.4; 204/159.15; 204/159.2; 525/126; 525/455; 525/920
[58] Field of Search ...................... 204/159.15, 159.27; 525/455, 126; 156/307.3, 331.4

[56] References Cited

U.S. PATENT DOCUMENTS

| | | | |
|---|---|---|---|
| 3,509,234 | 4/1970 | Burlant | 260/859 R |
| 3,674,743 | 7/1972 | Verdol | 260/859 R |
| 3,677,920 | 7/1972 | Kai | 204/159.15 |
| 3,678,014 | 7/1972 | Suzuki | 260/859 R |
| 3,694,415 | 9/1972 | Honda | 260/859 R |
| 3,855,379 | 12/1974 | Araki | 260/859 R |
| 3,873,640 | 3/1975 | Owston | 260/859 R |
| 3,891,523 | 6/1975 | Hisimatsu | 204/159.15 |
| 3,989,609 | 11/1976 | Brack | 204/159.15 |
| 4,013,806 | 3/1977 | Volkert | 260/859 R |
| 4,020,125 | 4/1977 | Suzuki | 260/859 R |
| 4,034,017 | 7/1977 | Chang et al. | 260/859 R |
| 4,041,104 | 8/1977 | Selley | 260/859 R |
| 4,192,684 | 3/1980 | Gensho | 204/159.15 |
| 4,221,840 | 9/1980 | Alvino | 525/126 |

FOREIGN PATENT DOCUMENTS

| | | |
|---|---|---|
| 1253757 | 11/1971 | United Kingdom . |
| 1344861 | 1/1974 | United Kingdom . |
| 1373045 | 11/1974 | United Kingdom . |

OTHER PUBLICATIONS

Product Data Bulletin No. 505, 5/1/65 PolyBd; Sinclair Petrochemicals Inc.

*Primary Examiner*—Paul Lieberman
*Attorney, Agent, or Firm*—Jean B. Mauro; J. Rodney Reck; Daniel A. Scola, Jr.

[57] ABSTRACT

A polymerizable adhesive and sealant composition comprising a urethane-acrylate-capped prepolymer based on a polybutadiene polyol or polyamine having at least about 70 percent of the butadiene units in the 1,4-configuration. The composition provides improved thermal, impact and cure-through-gap properties. A process for preparing the composition and a process for using it are also disclosed.

27 Claims, No Drawings

CURABLE POLYBUTADIENE-BASED RESINS HAVING IMPROVED PROPERTIES

This application is a continuation of co-pending patent application Ser. No. 64,170, filed Aug. 6, 1979, which is a continuation of Ser. No. 813,207, filed July 5, 1977, now abandoned, which is in turn a continuation-in-part of patent application Ser. No. 546,250, filed Feb. 3, 1975, now abandoned.

BACKGROUND OF THE INVENTION

1. Field of the Invention

This invention relates to certain polybutadiene-based resins, curable by peroxy initiation, and having improved thermal, impact, and cure-through-volume properties. More specifically, it relates to resins which may be viewed as a reaction product of, e.g., polybutadiene diols and their acrylonitrile copolymers with, e.g., methacrylate-capped aromatic diisocyanates.

2. Prior Art

It is known that curable resins having desirable properties may be prepared as the reaction product of an organic polyisocyanate and an acrylate ester having an active hydrogen in the non-acrylate portion of the ester. Such resins are disclosed in U.S. Pat. No. 3,425,988 to Gorman et al. This patent relates specifically to monofunctional, acrylate-terminated material which is reacted with organic polyisocyanate in such proportions as to convert all of the isocyanate groups to urethane or ureide groups. The acrylate esters are preferably the acrylates and methacrylates containing hydroxy or amino functional groups on the non-acrylate portions thereof.

U.S. Pat. No. 3,678,014 to Suzuki et al. discloses a peroxide-curable thermosetting resin comprising a reaction product of a polybutadiene or copolybutadiene having a preponderance of the 1,2-configuration of butadiene units and terminated with hydroxyl or carboxyl groups, and an isocyanate compound obtained by the reaction of an organic polyisocyanate with an olephinic compound such as a hydroxyalkyl acrylate or hydroxyalkyl methacrylate. The resins so produced are curable with peroxy initiators and are said to be useful as coatings or adhesives. Such resins are not fully satisfactory in terms of various properties, such as impact strength, thermal strength (i.e., strength at high temperatures or after high-temperature aging), and, moreover, do not have the ability to cure satisfactorily through relatively large gaps, e.g., approximately 40–50 mils or more.

U.S. Pat. No. 3,674,743 to Verdol et al. tracks self-curing solid elastomers made by reacting a polyfunctional, hydroxyl-reactive compound (e.g., a polyisocyanate) with a polyhydroxyl polymer. That polymer is made from a 1,3-diene having about 40–70 percent trans-1,4-unsaturation and about 10–30 percent cis-1,4-unsaturation. The elastomeric product is useful as a binder, coating, etc., and is stated to have certain improved properties, e.g., flexibility and tear strength. However, the product is not known as an adhesive, no thermal or cure-through-gap properties are suggested, and no particular advantage is attributed to the 1,4-unsaturation. Moreover, the product is not acrylate-/methacrylate-terminated and thus is fundamentally different in structure from the compounds of the present invention.

U.S. Pat. No. 3,431,235 to Lubewitz discloses the cyclization of a reaction product of, e.g., hydroxyl-terminated 1,2-polybutadiene with toluene diisocyanate. While this results in certain useful properties, the heat stability, cure speed, and cure-through-volume properties are unsatisfactory.

SUMMARY OF THE INVENTION

Now, however, there is provided a polymerizable adhesive and sealant composition having improved thermal and impact properties and curable through gaps of more than 40 mils, comprising:

I. a polymerizable product corresponding in structure to a reaction product of:
   (a) a polybutadiene polyol or polyamine comprising about 5 to about 150 butadiene units and having at least about 70 percent of the butadiene units in the 1,4-configuration and selected from the group consisting of polybutadiene and butadiene acrylonitrile copolymers, and either of:
   (b) (i) a molar excess of a reaction product of: a molar excess of an aromatic or cycloaliphatic polyisocyanate with a compound selected from the group consisting of an aromatic or cycloaliphatic polyol, or
   (ii) a molar excess of an aromatic or cycloaliphatic polyisocyanate,
   the product of (a) and (b)(i) or (a) and (b)(ii) subsequently being reacted with a molar excess of a hydroxyalkyl acrylate, a hydroxyalkyl methacrylate, an aminoalkyl acrylate, or an aminoalkyl methacrylate; and II. A free radical initiator.

There is also provided a process for preparing the monomer of Part I, above, comprising reacting the polybutadiene of part I(a) with either of:
   (i) a molar excess of a reaction product of: a molar excess of an aromatic or cycloaliphatic polyisocyanate with a compound selected from the group consisting of an aromatic or cycloaliphatic polyol, or
   (ii) a molar excess of an aromatic or cycloaliphatic polyisocyanate,
the product subsequently being reacted with a molar excess of a hydroxyalkyl acrylate, a hydroxyalkyl methacrylate, an aminoalkyl acrylate, or an aminoalkyl methacrylate.

In addition, there is provided a process for sealing or adhering surfaces which comprises applying to at least one of said surfaces the above polymerizable compositions, then placing said surfaces in an abutting relationship until the composition has cured.

DETAILED DESCRIPTION OF THE INVENTION

The monomer of the present invention may be viewed as a one-component polymerizable block copolymer having rigid and flexible segments. This is achieved by the chemical linking of two "pre-polymers" which are subsequently "capped" with acrylate, e.g. methacrylate, functionality. Accordingly, in a preferred embodiment, a "flexible" polymeric butadiene polyol segment of relatively low molecular weight is reacted with a molar excess of a "rigid" diisocyanate such as toluene diisocyanate or methylene diisocyanate (4,4'-ddiisocyanato diphenylmethane), thereby forming urethane linkages. Before reacting with the polybutadiene polyol, the diisocyanate is preferable reacted in excess with another rigid moiety containing at least two active hydrogen atoms, such as in hydroxy or amine groups, thereby capping the other rigid moiety with —NCO groups. By the term "rigid" segment is meant a segment or segments containing aromatic, heterocyclic or cycloaliphatic rings. If multiple segments are involved, they should be joined by either fusing of the rings or by a minimum number of carbon atoms (e.g., 1-2 if linear, 1-about 6 if branched) such that there is little or no flexing of the segments. By the term "flexible" segment is meant a segment comprising primarily linear aliphatic moieties containing internal unsaturation. Pendant functional groups, including aromatic, heterocyclic and cycloaliphatic, among others, as well as branching, may also be incorporated, provided that there is no substantial interference with the necessary flexible nature of the linear portion.

Illustrative of the polyisocyanates employed in the preparation of the new monomers are, among others, phenyl diisocyanate, toluene diisocyanato, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl) cyclohexane, cyclohexylene diisocyanate, tetrachlorophenylene diisocyanate, 2,6-diethyl-p-phenylenediisocyanate, and 3,5-diethyl-4,4'-diisocyanatodiphenyl-methane. Still other polyisocyanates that may be used are the higher molecular weight rigid polyisocyanates obtained by reacting polyamines containing terminal, primary and secondary amine groups or polyhydric alcohols, for example, the alkane, cycloalkane, alkene and cyclokane polyols such as glycerol, ethylene glycol, bisphenol-A, 4,4'-dihydroxyphenyldimethylmethane-substituted bisphenol-A, and the like, with an excess of any of the above-described isocyanates. These higher molecular weight urethane or ureide polyisocyanates may be represented by the formula:

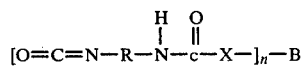

wherein R is an organic radical selected from the group consisting of alkyl, alkenyl, cycloalkyl, cycloalkenyl, aryl, aralkyl and alkaryl radicals of 2 to about 20 carbon atoms, both substituted and unsubstituted; X is —O— or

wherein R' is hydrogen or lower alkyl of 1 to 7 carbon atoms; B is a polyvalent organic radical selected from the group consisting of cycloalkyl, cycloalkenyl, aryl, aralkyl and heterocyclic radicals, both substituted and unsubstituted; and n is an integer from 2 to about 6.

As indicated above, the diisocyanato is preferably reacted with another rigid segment comprising an aromatic, heterocyclic or cycloaliphatic compound containing at least two active hydrogen atoms, preferably diamines and more preferably diols. Suitable compounds are 2,2-(4,4'-dihydroxydiphenyl)-propane (i.e., (bisphenol A), 4,4'-iso-propylidenedicyclohexanol (i.e., (hydrogenated bisphenol A), ethoxylated bisphenol A, propoxylated bisphenol-A, 2,2-(4,4'-dihydroxydiphenyl)-butane, 3,3-(4,4'-dihydroxydiphenyl)-pentane, $\alpha,\alpha'$-(4,4'-dihydroxydiphenyl)-p-diisopropylbenzene, 1,3-cyclohexane diol, 1,4-cyclohexane diol, 1,4-cyclohexanedimethanol, bicyclic and tricyclic diols such as 4,8-bis-(hydroxymethyl)-tricyclo [5.2.1.0$^{2,6}$] decane, 2,2,4,4-tetramethyl-1,3-cyclobutanediol, hydroquinone, resorcinal, and 2,2-(4,4'-dihydroxydiphenyl)-sulfone, among others, as well as halogenated derivatives of the above, such as tetrabrominated ethoxylated bisphenol-A. These ring compounds may also be substituted with either reactive groups or unreactive groups such as alkyl groups containing about 1 to 4 carbon atoms. This reaction may be carried out at temperatures from room temperature to about 180° C., preferably about 40°-120° C., depending upon the specific reactants selected. At the lower temperatures, use of standard catalysts may be desirable. Unreactive diluents may be used, if desired.

The polyisocyanate thus formed is reacted with a polymeric butadiene compound having at each end of the butadiene chain a functional group containing a reactive hydrogen atom, preferably in a hydroxyl group.

The polybutadienes of this invention have a preponderance of the butadiene units in a specific configuration, namely, the 1,4-configuration.

It is well known that 1,3-butadiene can enter into a polymer chain according to either of the following two structures: the 1,2-form, resulting in pendant reactive groups

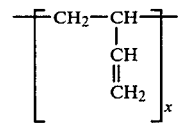

or the 1,4-form, resulting in a linear unsaturated chain

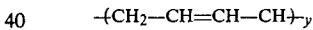

The 1,2-form has been recognized in the art as useful in preparing adhesive formulations. However, until the present invention, the importance of the 1,4-form in providing superior properties had not been recognized.

The present invention requires that the polybutadiene or copolybutadiene used contain over about 50 percent, preferably at least about 70 percent, and more preferably at least about 80 percent, of the 1,4-configuration. Techniques for the preparation of such material are known to the art, and a number of suitable materials are commercially available (some of which appear in the Examples below).

The 1,4-fraction of the butadiene polyols used in the present invention corresponds to the formula

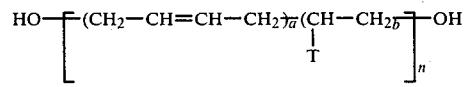

wherein a may vary from 0.65 to about 1.0, preferably from about 0.75 to about 0.85; b may vary from 0 to about 0.35, preferably from about 0.25 to about 0.15; n may vary from about 5 to about 150, preferably from about 10 to about 85; and T is hydrogen or an organic radical derived from such compounds as styrene and its simpler derivatives, lower alkyl acrylates and methacrylates, and acrylonitrile, the latter being especially preferred. Naturally, T should be selected so as not to substantially interfere with the properties imparted by the rest of the molecule. When b is not zero, the comonomer residue weight percent to which b relates should constitute less than about 40 percent of the whole copolymer moiety and preferably less than about 30 percent.

The flexible polybutadiene or copolybutadiene having functional groups containing an active hydrogen is reacted with the polyisocyanate in such proportion that the polyisocyanate is present in molar excess as to the concentration of the active hydrogen-containing groups on the polybutadiene. In this way a product is assured which has an —NCO group at each end of the polybutadiene segment. The molar excess of polyisocyanate may vary from about 0.05 to about 6.

This reaction may be carried out at temperatures from about room temperature to about 150° C., preferably from about 40° C. to about 120° C. After addition of the flexible diol, about 0.1 to 30 hours are required for completion at the preferred temperature range. The reaction may also be catalyzed, if desired, and unreactive diluents may be used for viscosity control.

The product of the above reaction is reacted with a molar equivalence, preferably a molar excess, based on —NCO group content, of an acrylate or methacrylate ester containing a hydroxy or amine group on the nonacrylate portion thereof. This results in an adhesive/sealant monomer, or more accurately, prepolymer, capped at both ends with acrylate or methacrylate functionality. Esters suitable for use in this invention correspond to the formula

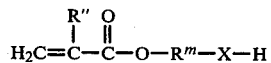

wherein X is as previously defined, R" is selected from the class consisting of hydrogen, chlorine and methyl and ethyl radicals; and R''' is a divalent organic radical selected from the group consisting of lower alkylene of 1-8 carbon atoms, phenylene and naphthylene.

The suitable hydroxy and amine-containing materials are exemplified by, but not limited to, such materials as hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxy octyl methacrylate, and the monoacrylate or monomethacrylate esters of bisphenol-A, the fully hydrogenated derivative of bisphenol-A, and cyclohexyl diol, and the like.

The reaction may be accomplished in the presence or absence of diluents. Preferably, diluents which include the hydrocarbons, such as aliphatic, cycloaliphatic and aromatic hydrocarbons, for example, benzene, toluene, cyclohexane, hexane, heptane, and the like, are employed, but other diluents, such as methyl isobutyl ketone, diamyl ketone, isobutyl methacrylate, and cyclohexyl methacrylate can also be beneficially utilized, if desired, especially where complete compatibility with the sealant system is desired.

The temperature employed in the reaction may also vary over a wide range. Where the components are combined in approximately chemical equivalent amounts, useful temperatures may vary from room temperature or below, e.g., 10° C. to 15° C., up to and including temperatures of 100° to 180° C. Where reacting the simpler isocyanate adducts, the components are preferably combined at or near room temperature, such as temperatures ranging from 20° C. to 30° C. At the lower reaction temperatures, use of a catalyst is preferred. When reacting the higher molecular weight isocyanate adducts, higher temperatures are preferred, e.g., about 40° C. to about 150° C.

It will be recognized that the acrylate-terminated butadieneisocyanate adducts of this invention can be prepared by processes other than that described above. Thus, for instance, the polyisocyanate compound can be reacted with a suitable hydroxyacrylate and this adduct reacted with a suitable butadiene polymer or copolymer having the necessary reactive hydrogen. Such a technique is described in the above-cited U.S. Pat. No. 3,678,014.

The fully-prepared monomeric prepolymers of this invention correspond to the formula

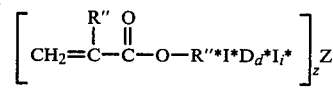

wherein R", and R" are as previously defined; I is a polyisocyanate radical; D is an aromatic, heterocyclic or cycloaliphatic polyol or polyamine radical, preferably a diol, and more preferably a diol of a cycloaliphatic compound; Z is a polymeric or copolymeric polyol or poly radical of butadiene, the latter having a degree of polymerization of from about 5 to 150 and at least about 70 percent of the polybutadiene portion of the 1,4-configuration; z is an integer corresponding to the valency of Z; d is either 1 or 0; and i is 0 when d is 0, and otherwise is equal to one less than the number of reactive hydrogen atoms of D. As used herein, an asterisk(*) indicates a urethane (—NH—COO—) or ureide (—NH—CO—NH—) bond.

The prepolymer described above cures to a hard, tough resin via a free-radical mechanism using any of a wide variety of known peroxy initiators. Illustrative of such initiators are the diacyl peroxides such as benzoyl peroxide; dialkyl peroxides such as di-tert.-butyl peroxide; ketone peroxides such as methylethyl ketone peroxide; and peresters which readily hydrolyze, e.g., tert.-butyl peracetate, tert.-butyl perbenzoate, di-tert.-butyl diperphthalate, etc. A particularly useful class of peroxy initiators are the organic hydroperoxides such as cumene hydroperoxide, methylethyl ketone hydroperoxide, tert.-butyl hydroperoxide, etc. Of these, cumene hydroperoxide is especially preferred. The initiators should be used at a concentration of about 0.01 percent to about 10 percent by weight of the total formulation, preferably about 0.1 percent to about 5 percent by weight. Another useful class of initiators comprises carbonyl-containing ultraviolet-activated free-radical generators, such as acetophenone, benzophenone, and the benzoin ethers. Suitable UV initiators are disclosed in co-pending application Ser. No. 356,679, filed May 2, 1973. Initiator mixtures may also be used.

It will also be understood that the curable composition of this invention can also be formulated as a two-part composition. In such a case, the initiator or one of a combination of initiators can comprise a second part which is combined with the first, monomeric, part at the point of use. Thus, the monomer can be applied to one surface to be joined, the initiator can be applied to a second surface, and the two surfaces then joined. Similarly, an accelerator, such as mentioned below, can be applied separately as a second part to one of the surfaces to be joined, e.g., as a "primer."

It may be desirable to accelerate the cure polymerization by application of moderate amounts of heat, e.g., 50° C. to 150° C. At temperatures above about 125° C., cure will typically be complete within about 10 minutes or less.

The prepolymers of this invention can be formulated into room temperature-curing anaerobic adhesives and sealants. Formulations of this type are well described in the art, e.g., U.S. Pat. Nos. 3,043,820 to Krieble and 3,678,014, above cited, among others, utilizing e.g., the hydroperoxide class of initiators, such anaerobic formulations may also advantageously include polymerization accelerators such as organic imides (e.g., benzoic sulfimide) and primary, secondary or tertiary amines, and inhibitors or stabilizers of the quinone or hydroquinone families. The accelerators are generally employed in concentrations of less than 10 percent by weight, and the inhibitors in concentrations of about 10 to 1,000 parts per million. When prepared as anaerobic formulations, the compositions of this invention have the advantage of long-term stability and the ability to cure at room temperature upon exclusion of oxygen, as between the mating threads of a nut and bolt or the juxtaposed surfaces of a bearing and shaft. The anaerobic cure speed can be enhanced by application of moderate heat, e.g., up to about 150° C.

The adhesive and sealant formulations of this invention may be prepared, if desired, with reactive diluents which are capable of copolymerizing with the instant prepolymers. Typical of such diluents are the hydroxyalkyl acrylates such as hydroxyethyl acrylate, hydroxypropyl acrylate, and the corresponding methacrylate compounds, including cyclohexyl methacrylate, and tetrahydrofurfuryl methacrylate. Other unsaturated reactive diluents, such as sytrene and acrylonitrile, can also be used. When used, the concentration of such diluents should be less than about 60 percent by weight, and preferably about 40 to about 10 percent.

One of the significant advantages of the prepolymers of this invention is their exceptional ability to cure through large gaps, e.g., up to about 85 mils. This behavior may be enhanced by application of moderate heat. Preferably, however, it is enhanced by use of any of the primers known for anaerobic systems, such as those disclosed in U.S. Pat. No. 3,625,930 to Toback, et al., and particularly those of the thiourea type disclosed in pending application Ser. No. 323,689, filed Jan. 15, 1973. Such primers are advantageously applied as a spray from dilute solvent solution to either or both surfaces to be joined.

The following examples provide specific illustrations of various aspects of the present invention and are in no way limitations on it.

EXAMPLE 1

To a nitrogen-swept 4-necked resin kettle equipped with a stainless steel stirrer, nitrogen inlet tube, thermometer, condenser, and entrance port were charged 34.8 grams of toluene diisocyanate (TDI) (80% 2,4-/20% 2,6-). The TDI was heated to approximately 95°–100° C. Eighteen grams of hydrogenated bisphenol-A (HBPA) were added slowly in 1 to 1½ hours. Fifteen minutes after the HBPA additions were completed, a solution of 36.5 grams triethyleneglycol dimethacrylate (TRIEGMA) and 150 ppm of a quinone stabilizer were added. Fifteen minutes later, addition of 6.0 grams of HBPA in 3–5 portions was performed. Fifteen minutes after all the HBPA was in (total, 24.0 grams), the bath temperature was lowered such that the reaction mixture was at 60°–65° C. The reaction mixture consisted of a toluene diisocyanate-capped-HBPA prepolymer(s) (abbreviated TDI*HBPA*TDI) dissolved in TRIEGMA. (As used in these Examples, asterisks represent urethane bonds. "x" is an integer corresponding to the valency of the polyol).

To the reaction solution were added 98.0 grams of a degassed poly(butadiene-acrylonitrile) (P(BD-CN)) polyol resin of which the butadiene portion contains approximately 80 percent of the 1,4-isomer (Arco CN-15 resin, OH#-0.62; manufactured by Arco Chemical Co., Philadelphia, Pennsylvania) over a two-hour period. The reaction solution was maintained at a temperature of about 65° C. Heating and stirring were continued one additional hour. A diluent solution of 24.5 grams of TRIEGMA and 150 ppm of a quinone stabilizer were gradually added to maintain a fluid reaction medium. Thirty-two grams of 96% hydroxypropyl methacrylate (HPMA) were added and the reaction solution was maintained at 60°–70° C. for an additional 30–45 minutes. The resultant solution contained approximately 70% concentration of urethane dimethacrylate structures corresponding to the general formula (HPMA*TDI*HBPA*TDI)$_x$*[P(BD-CN)].

EXAMPLE 2

Example 1 was repeated, except that 1,3-butyleneglycol dimethacrylate (BDMA) was substituted for the TRIEGMA. The corresponding prepolymer was obtained.

EXAMPLE 3

Example 1 was repeated, except the ethoxylated bisphenol-A dimethacrylate was substituted for the TRIEGMA, and approximately 10 percent more was used to maintain a fluid medium. The corresponding prepolymer was obtained.

EXAMPLE 4

Example 1 was repeated, except that bisphenol-A (BPA) was substituted for the hydrogenated bisphenol-A. The corresponding prepolymer was obtained.

EXAMPLE 5

To a nitrogen-swept, heated (about 60° C.) resin kettle, equipped as described in Example 1, were charged 21.5 grams of methylene-bis-phenylisocyanate (MDI) and a solution of 21.5 grams of TRIEGMA and 150 ppm of a quinone stabilizer. When the solution was at 60°–65° C., 93.0 grams of the degassed butadiene-acrylonitrile copolymer diol of Example 1 were added slowly over a 2–3 hour period. A diluent solution of 23.8 grams of TRIEGMA and 150 ppm of a quinone stabilizer was used to maintain a fluid reaction medium. Finally, 25.6 grams of HPMA were added to attain the desired urethane methacrylate end groups, as described in Example 1. The prepolymer so produced corresponded to the following general formula:

(HPMA*MDI)$_x$*[P(BD-CN)]

EXAMPLE 6

Under a nitrogen atmosphere, the previously-described resin kettle was heated to about 65° C. The kettle was charged with 14.0 grams of TDI and a solution of 21.5 grams of TRIEGMA and 150 ppm of a quinone stabilizer. The addition of 130 grams of the above-described degassed CN-15 was done over a 2½ to 3-hour span while the temperature was maintained at 65°-70° C. After an additional 1½ to 2 hours of heating, and further periodic additions of a diluent solution (26.3 grams of TRIEGMA and 100 ppm stabilizer), 20.3 grams of 96% HPMA were added slowly (5 minutes). The solution was heated for an additional hour to complete the reaction. The product prepolymer corresponded to the general formula:

(HPMA*TDI)$_2$*[P(BD-CN]

EXAMPLE 7

Under a nitrogen atmosphere, the previously described resin kettle was heated to about 60° C. The following was charged to the kettle: 24.4 grams of MDI and a solution of 20.0 grams TRIEGMA and 200 ppm of a quinone stabilizer. When the solution was at 61°-65° C., addition of 130 grams of degassed polybutadiene diol (P(BD)) (Arco Chemical Co., Philadelphia, Penn., R-45M, 80% 1,4 microstructure) was commenced. The polybutadiene diol was added over a 3-hour span. Towards the end of the diol addition, a diluent solution (20.2 grams of TRIEGMA with 100 ppm of a quinone stabilizer) was added to maintain a fluid reaction medium. After the diol and diluent solution additions were completed, 24.4 grams of 96% HPMA were added over a 5-minute period. Heating was continued for 1-2 hours longer. The resulting prepolymer corresponded to the general formula:

(HPMA*MDI)$_x$*[P(BD)]

EXAMPLE 8

Example 1 was repeated, except that 108.2 grams of a degassed poly(butadiene-co-sytrene) (P(BD-STY) polyol resin of which the butadiene portion contained approximately 80% of the 1,4 isomer (Arco C5-15 resin, OH#=0.62; manufactured by Arco Chemical Co.) was substituted for the poly(butadiene-co-acrylonitrile) polyol. The prepolymer formula so produced corresponded to the following general formula (HPMA*TDI*HBPA*TDI)$_x$*[P(BD-STY)].

EXAMPLE 9

This example illustrates a typical anaerobic adhesive formulation utilizing any of the prepolymers, or mixtures thereof, described above. With good stirring, add 4.6 grams of hydroxypropyl methacrylate to 79 grams of the prepolymer resin product solution (70-75 precent solids). A solution of 0.7 gram saccharine dissolved in 7.6 grams of triethyleneglycol dimethacrylate (as solvent) is then stirred in. Subsequently, 5.6 grams of acrylic acid (adhesion enhancer) and 2.8 grams of cumene hydroperoxide (CHP) are added and stirring is continued for about 1 hour. Minor amounts of stabilizers, accelerators, thickeners, plasticizers, and the like, may be added, as desired, as is known in the art.

Anaerobic adhesive formulations were prepared according to the preceding procedure (except that for prepolymer H, t-butyl perbenzoate was used instead of CHP) and designated as follows:

TABLE I

| Prepolymer | General Structure |
|---|---|
| A | (HPMA*MDI)*$_x$[P(BD)] |
| B | (HPMA*TDI*HBPA*TDI)*$_x$[P(BD)] |
| C | (HPMA*MDI)*$_x$[P(BD-CN)] |
| D | (HPMA*TDI*HBPA*TDI)*$_x$[P(BD-CN)] |
| E | (HPMA*TDI*BPA*TDI)*$_x$[P(BD-CN)] |
| F | (HEMA*TDI*BPA*TDI)*$_x$[P(BC-CN)] |
| G | (HPMA*TDI)*$_x$[P(BD-CN)] |
| H | (HPMA*TDI*HBPA*TDI)$_x$[P(BD-STY)] |

The typical strength properties for these adhesive formulations are reported in Table II, below. Tensile strength measurments were performed according to ASTM D-2095-72. Simply described, this test involves adhering together two steel rods by butt joining their respective ends. The opposite rod ends are then pulled with a measuring device such as an Instron Tester, and the tensile strength of the bond is measured. The tensile lap shear test was performed according to ASTM D-1002-65. This test involves adhering together overlapping surfaces of two steel test strips. The ends of the so-assembled specimens are pulled with a measuring device such as an Instron Tester, and the tensile shear strength of the bond is measured. Compressive shear, tested according to military specification MIL-R-46082A(MR), measures the ability of an adhesive to retain a sleeve or bearing on a shaft. The test involves adhering a cylindrical "pin" within the bore of a mating collar. The force required to press the pin from the collar is then measured on an Instron tester or equivalent. Impact strength was tested according to ASTM D-950-72. This test involves a steel block mated to another steel block with adhesive and then struck by a swinging pendulum device, such as a Baldwin Impact Tester. The impact force required to separate the blocks is measured. The hot strength test is similar to the compressive shear test described, except that the specimen is stored for 1¼-1½ hours at 400° F. and is also tested at that temperature. Heat (200° F.) was used, for convenience, to accelerate cure in all tests; for one hour in the tensile and compressive shear tests, and for 1½ hours in the impact test.

TABLE II

| Prepolymer | Tensile psi | Tensile Lap Shear psi | Compressive Shear, psi | Impact Strength ft.lbs./ sq. in. | Hot Strength psi |
|---|---|---|---|---|---|
| A | 3030 | 2400 | 2100 | 3.9 | 980 |
| B |  | 3110 | 2620 | 2.7 | 480 |
| C | 3450 | 3100 | 2920 | 9.1 | 880 |
| D | 6590 | 3860 | 3730 | 12.1 | 710 |
| D[(1)] | 6890 | 4420 | 4440 | 14.2 | 900 |
| E |  | 3920 | 3500 | 12.3 | 900 |
| F |  | 4100 | 3310 | 7.3 | 710 |
| G | 3580 | 2090 | 2560 | 12.0 |  |
| H |  | 3355 | 3785 | — | 770 |

[(1)]Prepolymer D formulated with ethoxylated bisphenol-A dimethacrylate as solvent instead of TRIEGMA.

It is also an advantageous characteristic of the present prepolymer adhesive formulations that they are capable of curing to structurally acceptable strengths at room temperature even without use of a primer or activator. Using the compressive shear test as an illustration, prepolymers D and F, above, develop strengths of about 1800 psi in 24 hours and 2500-3000 psi in 72 hours. Of course, cure speed can be enhanced by use of a known primer such as tetramethyl thiourea of the condensation product of butyraldehyde and aniline.

EXAMPLE 10

One of the merits of the adhesives formed from the prepolymers of this invention is their ability to retain useful levels of strength after lengthy exposure to high temperatures. This is illustrated in Table III. The strength test used was the compressive shear test already described. The specimens were aged at 450° F. for the number of weeks shown, then divided into two groups, which were tested at room temperature and 400° F., respectively. The resin used was prepolymer D, above.

TABLE III

| Heat Aging Period, Weeks | Compressive Shear Strength, psi | |
|---|---|---|
| | room temperature | 400° F. |
| 0 | 2750 | 480 |
| 1.0 | 3060 | 1100 |
| 1.5 | 2360 | 750 |
| 2.0 | 1470 | 350 |
| 2.5 | 1400 | 260 |
| 3.0 | 260 | 240 |
| 4.0 | 350 | 200 |
| 5.0 | 100 | 80 |
| 6.0 | 30 | 50 |

EXAMPLE 11

Another distinct advantage of the present prepolymers is their ability to cure through large gaps, e.g., 40 mils or more. Table III presents typical tensile shear and impact strengths for prepolymer D, above, at different gaps. Except for the instance noted in the Table, cures were achieved at room temperature on sand-blasted steel surfaces primed with a tetramethyl thiourea activator known to the art. Cure time up to 20 mils was 24 hours; at 41 mils and above, it was 72 hours.

TABLE IV

| Gap, mils | Tensile Shear Strength, psi | Impact, Strength ft.lbs./sq.in. |
|---|---|---|
| 0 | 2340 | 12.0 |
| 20 | 1800 | 9.2 |
| 41 | 1430 | 9.9 |
| 55 | 960 | 5.5 |
| 85 | 360 | |
| 85* | 1370 | |

*with additional heat cure: 1 hour at 200° F.

EXAMPLE 12

A curable formulation was prepared using prepolymer D (Table I) according to the procedure of Example 8, except that 3-5 percent (based on total formulation weight) benzophenone was substituted for the CHP. A 2-5 mil thick film of the formulation was spread on a piece of glass and exposed to ultraviolet radiation. The UV source was a 400-watt mercury vapor bulb housed in a "Porta-Cure 400" lamp, both bulb and lamp manufactured by American Ultraviolet Co. The UV source was adjusted to provide 600 microwatts of radiation intensity at the film. After 15-19 minutes of exposure, the formulation had cured to a hard, dry film.

The same formulation was used to assemble a lap shear test specimen, except that glass strips were used instead of steel. The specimen was exposed to UV radiation of 6,000 microwatts at the bond line. In about 40 seconds, the glass strips had become fixtured (could not be moved by hand relative to each other).

EXAMPLE 13

An adhesive formulation was prepared using prepolymer D (Table I) according to the procedure of Exhibit 8, except that 3-5 percent (based on total formulation weight) of benzoyl peroxide was substituted for the CHP. A 2-5 mil thick film of the adhesive was spread on a piece of steel and placed in a 200° F. oven for 1½ hours, then cooled to room temperature. The formulation cured to a dry, durable film.

A tensile lap shear test was performed with this formulation according to the ASTM procedure mentioned in Example 9. The same heat cure as above was applied, resulting in a bond strength of 3750 psi.

What is claimed is:

1. An adhesive and sealant composition having improved thermal and impact properties and curable through gaps of more than 40 mils, comprising:
   I. a polymerizable product corresponding in structure to a reaction product of:
      (a) a polybutadiene polyol of polyamine comprising about 5 to about 150 butadiene units and having at least about 70 percent of the butadiene units in the 1,4-configuration and selected from the group consisting of polybutadiene, butadiene-acrylonitrile copolymers, and butadiene-styrene copolymers, and,
      (b) a molar excess of a reaction product of: a molar excess of an aromatic or cycloaliphatic polyisocyanate with a compound selected from the group consisting of an aromatic or cycloaliphatic polyol,
   the product of (a) and (b) subsequently being reacted with a molar excess of a hydroxyalkyl acrylate, a hydroxyalkyl methacrylate, an aminoalkyl acrylate, or an aminoalkyl methacrylate; and
   II. a free radical initiator.

2. A composition of claim 1 wherein the polybutadiene polyol is a poly(butadiene-acrylonitrile)diol.

3. A composition of claim 1 wherein the polyisocyanate is toluene diisocyanate.

4. A composition of claim 1 wherein the polyisocyanate is 4,4'-diisocyanate diphenylmethane.

5. A composition of claim 1 wherein reaction product (b) is an NCO-terminated product of hydrogenated bisphenol-A and toluene diisocyanate.

6. A composition of claim 1 wherein the hydroxyalkyl methacrylate is hydroxyethyl methacrylate.

7. A composition of claim 1 wherein the hydroxyalkyl methacrylate is hydroxypropyl methacrylate.

8. A composition of claim 1 which additionally contains an organic solvent.

9. A composition of claim 8 wherein the solvent is a coreactive solvent.

10. A composition of claim 1 wherein the initiator is a peroxy initiator.

11. A composition of claim 1 wherein the initiator is an ultraviolet-activated initiator.

12. An anaerobic adhesive and sealant composition having improved thermal and impact properties and curable through gaps of more than 40 mils, comprising:
   I. a polymerizable product corresponding in structure to a reaction product of:
      (a) a polybutadiene polyol or polyamine comprising about 5 to about 150 butadiene units and having at least about 70 percent of the butadiene units in the 1,4-configuration and selected from the group consisting of polybutadiene, butadiene-acrylonitrile copolymers, and, (b) a molar excess of a reaction product of: a molar excess of an aromatic or cycloaliphatic polyisocyanate with a compound selected from the group consisting of an aromatic or cycloaliphatic polyol, the product of (a) and (b) subsequently being reacted with a molar excess of a hydroxyalkyl acrylate, a hydroxyalkyl methacrylate, an aminoalkyl acrylate, or an aminoalkyl methacrylate; and II. a peroxy initiator.

13. A composition of claim 12 wherein the peroxy initiator is a hydroperoxide.

14. A composition of claim 13 wherein the hydroperoxide is cumene hydroperoxide.

15. A composition of claim 12 wherein the polybutadiene polyol is a poly(butadiene-acrylonitrile)diol.

16. A composition of claim 12 wherein the polyisocyanate is toluene diisocyanate.

17. A composition of claim 12 wherein the polyisocyanate is 4,4'-diisocyanato diphenylmethane.

18. A composition of claim 12 wherein reaction products (b) is an NCO-terminated product of hydrogenated bisphenol-A and toluene diisocyanate.

19. A composition of claim 12 wherein the hydroxyalkyl methacrylate is hydroxyethyl methacrylate.

20. A composition of claim 12 wherein the hydroxyalkyl methacrylate is hydroxypropyl methacrylate.

21. A composition of claim 12 which additionally contains an organic solvent.

22. A composition of claim 21 wherein the solvent is a coreactive solvent.

23. A composition of claim 12 which additionally contains a polymerization accelerator.

24. A composition of claim 23 wherein the accelerator is an amide or amine.

25. An adhesive and sealant composition having improved thermal and impact properties and curable through gaps of more than 40 mils, comprising:

I. a polymerizable product corresponding in structure to a reaction product of:
(a) a polybutadiene polyol or polyamine comprising about 5 to about 150 butadiene units and having at least about 70 percent of the butadiene units in the 1,4-configuration, and
(b) a molar excess of a reaction product of: a molar excess of an aromatic or cycloaliphatic polyisocyanate with a compound selected from the group consisting of an aromatic or cycloaliphatic polyol, the product of (a) and (b) subsequently being reacted with a molar excess of a hydroxyalkyl methacrylate, an aminoalkyl acrylate, or an aminoalkyl methacrylate; and II. a free radical initiator.

26. A process for preparing an adhesive and sealant monomer having improved thermal properties and curable through gaps of more than 40 mils, comprising:

I. reacting:
(a) a polybutadiene polyol or polyamine comprising about 5 to about 150 butadiene units and having at least about 70 percent of the butadiene units in the 1,4-configuration and selected from the group consisting of polybutadiene, butadiene-acrylonitrile copolymers, and butadiene-styrene copolymers, and,
(b) a molar excess of a reaction product of: a molar excess of an aromatic or cycloaliphatic polyisocyanate with a compound selected from the group consisting of an aromatic or cycloaliphatic polyol, II. the product of (a) and (b) subsequently being reacted with a molar excess of a hydroxyalkyl acrylate, a hydroxyalkyl methacrylate, an aminoalkyl acrylate, or an aminoalkyl methacrylate.

27. A process for sealing or adhering surfaces which comprises: (A) applying to at least one of said surfaces an adhesive and sealant composition having improved thermal and impact properties and curable through gaps of more than 40 mils, comprising:

I. a polymerizable product corresponding in structure to a reaction product of:
(a) a polybutadiene polyol or polyamine comprising about 5 to about 150 butadiene units and having at least about 70 percent of the butadiene units in the 1,4-configuration and selected from the groups consisting of polybutadiene, butadiene-acrylonitrile copolymers, and butadiene-styrene copolymers, and,
(b) a molar excess of a reaction product of: a molar excess of an aromatic or cycloaliphatic polyisocyanate with a compound selected from the group consisting of an aromatic or cycloaliphatic polyol, the product of (a) and (b) subsequently being reacted with a molar excess of a hydroxyalkyl acrylate, a hydroxyalkyl methacrylate, an aminoalkyl acrylate, or an aminoalkyl methacrylate; and II. a peroxy free radical initiator (B) placing said surfaces in an abutting relationship until the composition has cured.

* * * * *

UNITED STATES PATENT OFFICE
CERTIFICATE OF CORRECTION

Patent No. 4,295,909  Dated October 20, 1981

Inventor(s) LOUIS J. BACCEI

It is certified that error appears in the above-identified patent and that said Letters Patent are hereby corrected as shown below:

Column 3, Line 19: "toluene diisocyanato" should read "toluene diisocyanate".

Column 3, Line 41: In the formula "c" should be replaced by a capital C - "C".

Column 3, Line 59: "diisocyanato" should read "diisocyanate".

Column 5, Line 36: In the formula, "$R^m$" should read "$R'''$".

Column 10, Line 10: In the Table, Under Prepolymer F, "(HEMA*TDI*BPA*TDI*$_x$[P(BC-CN)]" should read:

"(HEMA*TDI*HBPA*TDI)$_x$*[P(BC-CN)]".

Signed and Sealed this

Twelfth Day of October 1982

[SEAL]

Attest:

GERALD J. MOSSINGHOFF

Attesting Officer  Commissioner of Patents and Trademarks